United States Patent [19]
Stephan et al.

[11] Patent Number: 5,421,696
[45] Date of Patent: Jun. 6, 1995

[54] ZERO ERROR Z-AXIS COMPLIANCE ROBOTIC DEVICE AND PROCESS

[75] Inventors: Frank M. Stephan, Galveston; Thurman R. Reed, Indianapolis; Arthur F. Pilling, Greentown, all of Ind.

[73] Assignee: Delco Electronics Corp., Kokomo, Ind.

[21] Appl. No.: 968,934

[22] Filed: Oct. 30, 1992

[51] Int. Cl.$^6$ ............................................. B25J 17/02
[52] U.S. Cl. .................................. 414/751; 29/740; 29/832; 901/16; 901/29; 901/45; 901/49
[58] Field of Search .................. 901/45, 16, 49, 29; 384/49; 414/730, 751, 786; 29/832, 740, 840

[56] References Cited

U.S. PATENT DOCUMENTS

| | | | |
|---|---|---|---|
| 3,824,674 | 7/1974 | Inoyama et al. | 901/45 X |
| 3,922,037 | 11/1975 | Yamada et al. | 384/49 |
| 4,648,727 | 3/1987 | O'Neil et al. | 384/49 |
| 4,827,607 | 5/1989 | Kobunsky et al. | 29/740 X |
| 4,836,111 | 6/1989 | Kaufmann | 901/16 X |
| 4,848,757 | 7/1989 | DeFazio | 901/45 X |

FOREIGN PATENT DOCUMENTS

| | | | |
|---|---|---|---|
| 3611806 | 10/1987 | Germany | 901/45 |
| 3-66583 | 3/1991 | Japan | 901/45 |

Primary Examiner—Donald W. Underwood
Attorney, Agent, or Firm—Cary W. Brooks; Jimmy L. Funke

[57] ABSTRACT

Disclosed is a robotic device having a sub-assembly constructed and arranged for zero error Z-axis compliance. The sub-assembly includes a vertically positioned bearing assembly having a shaft received in a ball bushing. The ball bushing may be received in a race. Spherical-shaped bearings are positioned in the bushing and project outwardly from the outer and inner surfaces of the bushing to form a smooth linear traveling surface. A plurality of lines of bearings may be positioned in the bushing. Each line of bearings may be skewed from the longitudinal axis of the bushing so that the lines of bearings form a blanket bearing surface covering substantially the outer surface of the shaft and inner surface of a race. In such a construction each bearing engages a different portion of the shaft and race as the bushing and shaft move in a vertical direction along the Z-axis. This reduces the wear on all contact surfaces and prolongs the life of the sub-assembly.

3 Claims, 2 Drawing Sheets

ZERO ERROR Z-AXIS COMPLIANCE ROBOTIC DEVICE AND PROCESS

FIELD OF THE INVENTION

The invention relates to robotic devices and more particularly to a robotic device for picking and placing components from one place to another with zero error Z-axis compliance.

BACKGROUND OF THE INVENTION

Prior robotic devices for picking and placing components from one position to another included sub-assemblies for moving the component in a vertical or Z-axis direction. A prior robotic sub-assembly 10 is illustrated in FIG. 2. Such sub-assemblies included a case housing 12 having received therein an aluminum cylindrical barrel 14 capable of moving in a Z-axis direction (line Z in FIG. 1). The sub-assembly also included three sets of ball bearings 16 positioned at approximately 120° from each other. The ball bearings are secured in position by modified dowel pins 18 extending through a longitudinal axis of the cylindrical ball bearing. The dowel pins have grooves for receiving retaining-rings 20 which hold the dowel pin in position. To position the double sealed ball bearings, it was necessary to mill out three small areas 22 having a width slightly larger than the longitudinal length of the cylindrical ball bearings. Further, in order to insert the modified dowel pins, three large areas 24 had to be milled out and bores drilled through the cylindrical ball bearing supports 26. The numerous processing steps for forming such prior sub-assemblies were undesirably expensive and labor intensive.

Further, the prior sub-assemblies had numerous disadvantages. The sub-assemblies lacked acceptable component location repeatability. The aluminum barrel experienced substantial wear and created substantial radial location error at the tool tip. The milled slots were also a source of rotational error which became worse with wear of the bearings. The bearings were directly exposed to the manufacturing environment which allowed them to become contaminated with dust and dirt producing "sticky" movement. Smooth movement was also hindered by bearing preload. When the barrel began to wobble due to wear, a load would have to be placed on the bearing by tightening a screw extending through the cylindrical bearing. Because the aluminum barrel wore unevenly, the bearing preload was adjusted resulting in a sacrifice of radial accuracy for smoother movement. The prior devices required frequent maintenance to adjust the bearing preload to accommodate for wear and to reduce radial error. These adjustments required total disassembly of the device which was complicated and time consuming.

Thus, heretofore there was a need for a robotic sub-assembly capable of producing zero error Z-axis compliance which was easy to manufacture, assemble, maintain and would have improved durability and wear resistance.

SUMMARY OF THE INVENTION

Generally, the invention includes a robotic device having a sub-assembly constructed and arranged for zero error Z-axis compliance. The sub-assembly includes a vertically positioned miniature stroke ball bushing assembly having a shaft received in a ball bushing which is received in an outer race. Ball bearings are positioned in the ball bushing and are slightly larger than the thickness of the cage to provide a smooth rolling surface. A plurality of lines of bearings may be positioned in the ball bushing. Each line of bearings in the ball bushing may be skewed from the longitudinal axis of the ball bushing so that the lines of bearings form a blanket bearing surface covering substantially the outer and inner cylindrical surfaces of the bushing. In such a construction each bearing engages a different portion of the outer race as the bushing and shaft move in a vertical direction along the Z-axis. This reduces the wear on the outer race and shaft surface and prolongs the life of the sub-assembly. The ratio between the shaft and ball bushing assembly travel is about 2 to 1.

In a preferred embodiment, the sub-assembly includes three bearing assemblies vertically positioned in the case housing at 120° with respect to each other. This construction eliminates rotational error as the gripper head moves in a vertical direction. Surprisingly, the three point bearing construction does not experience sticky movement but is truly free floating. The shaft of the sub-assembly is secured to a gripper plate which in turn carries a gripper for grasping the component to be moved from one place to another.

These and other features, advantages and objects of the present invention will become apparent from the following brief description of the drawings, detailed description, and appended claims and drawings.

DETAILED DESCRIPTION

Figure 1:
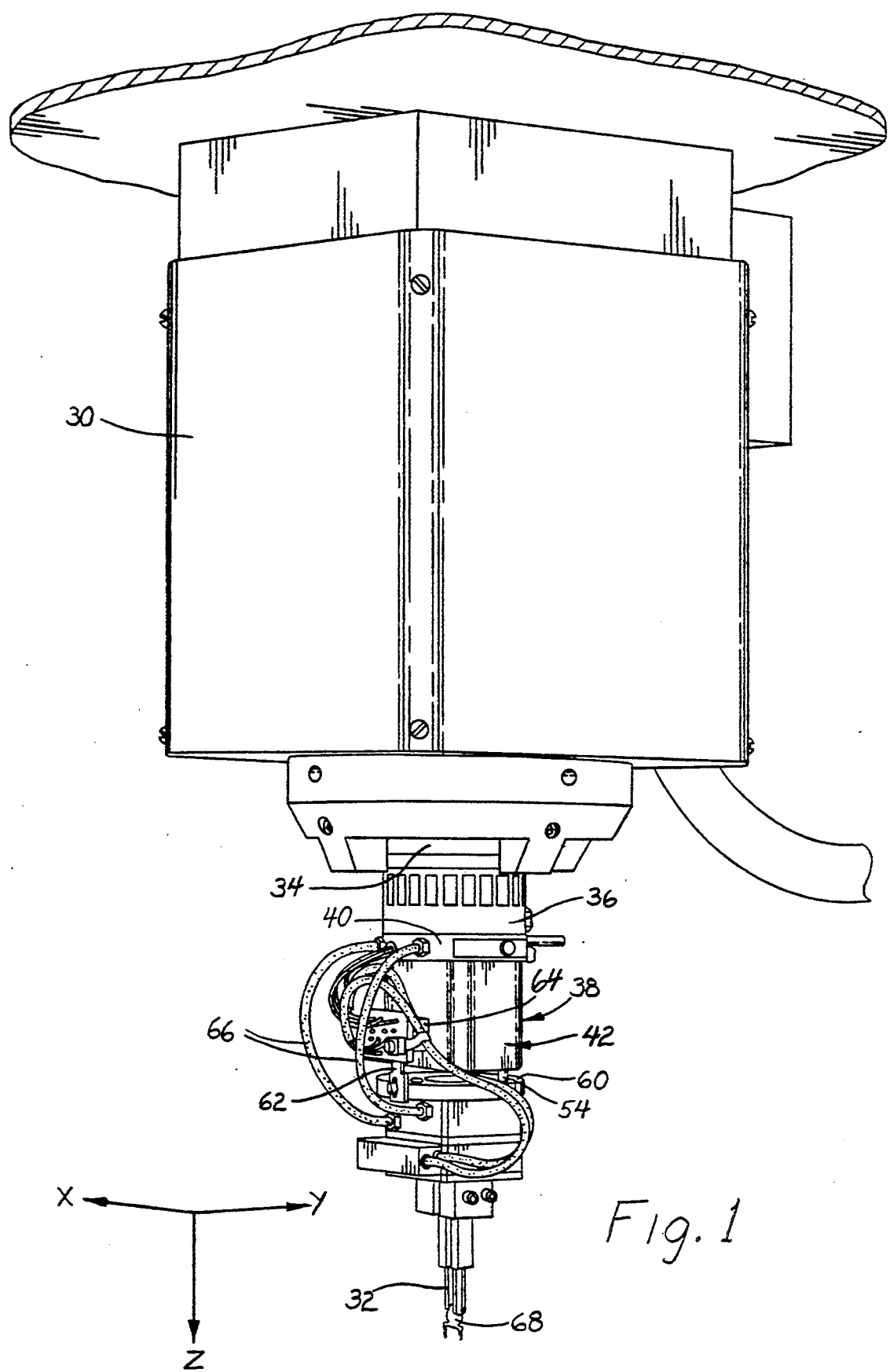
FIG. 1 is an illustration of a robotic device according to the present invention including a sub-assembly for movement along the Z-axis.
Figure 3:
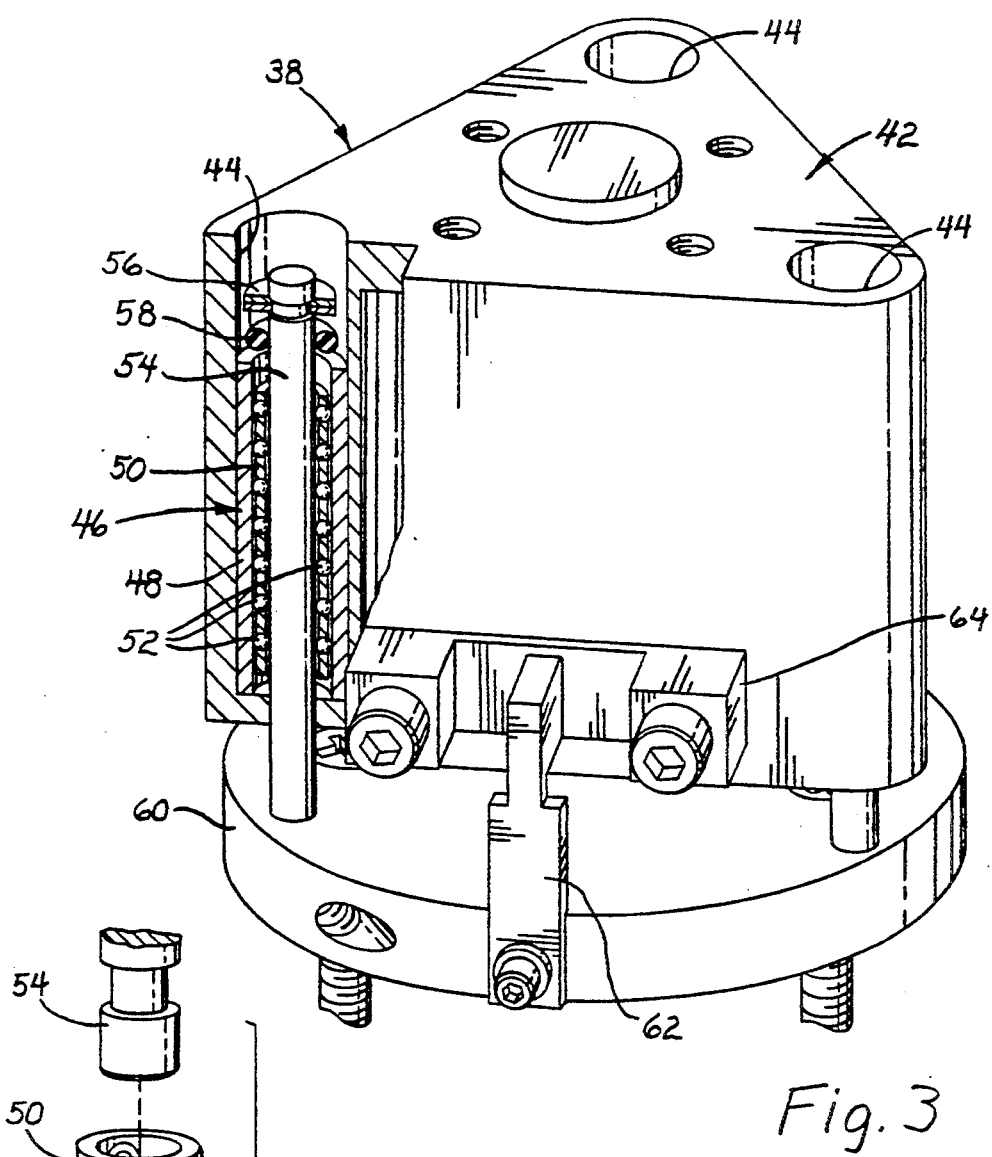
FIG. 3 is a perspective view with portions broken away of a robotic sub-assembly according to the present invention.

A robotic device according to the present invention includes a driver (not shown) for movement of arm 30 in the X-Y-axis direction orthogonal to vertical or Z-axis movement of a component gripper 32. The robotic device also includes a driver 34 for moving the component gripper in the vertical or Z-axis direction and a driver 36 for rotational movement of the component gripper. A suitable robotic system for X-Y-Z axis and rotational movement is available from Megamation Inc., under the trade name MEGA 1. A sub-assembly 38 according to the present invention is connected to the flange 40 for free floating movement of the gripper in a vertical or Z-axis direction. The free floating movement of the gripper in a vertical or Z-axis direction is important for accurate placement of component particularly for electrical components on a circuit board.

The sub-assembly preferably includes a triangular-shaped cast housing 42. Preferably the cast housing is made from a lightweight material such as magnesium. Such lightweight material greatly improves the cycle time for production placement of components in assembly operations. The cast housing has three bores 44 machined therein at 120° with respect to each other for receiving a miniature stroke ball bushing assembly 46 including an outer race 48, a ball bushing 50 having ball bearings 52 received in the race and a shaft 54 received in the ball bushing. The triangular positioning of the three assemblies eliminates rotational error and wobbling of the component during movement. The outer race is pressed into the bore to form a hard and dimensionally precise surface on which the ball bushing may move. The ball bushing is received within the outer race. The ball bushing includes a bushing having a plurality of bearings received therein and extending outwardly from both outer and inner surfaces of the ball bushing. The shaft is received in the ball bushing so that the shaft and the ball bushing both move as the gripper freely floats. The shaft moves in the vertical direction twice the distance that the ball bushing moves. This is because the bearings rolling within the ball bushing between the shaft and outer race. A stop 56 or retaining clip may be positioned at the upper end of the shaft to stop the travel of the shaft. Preferable a resilient O-ring 58 is positioned on the shaft below the retainer to absorb shock and reduce noise in sudden movement. The stop also prevents and damage to the ball bushing assembly. The shaft extends through the housing and is secured to a plate 60 for carrying a gripper. The gripper is constructed and arranged to easily pick up components, move them from one place to another and release the components at a desired location with accuracy.

Figures 2, 4:
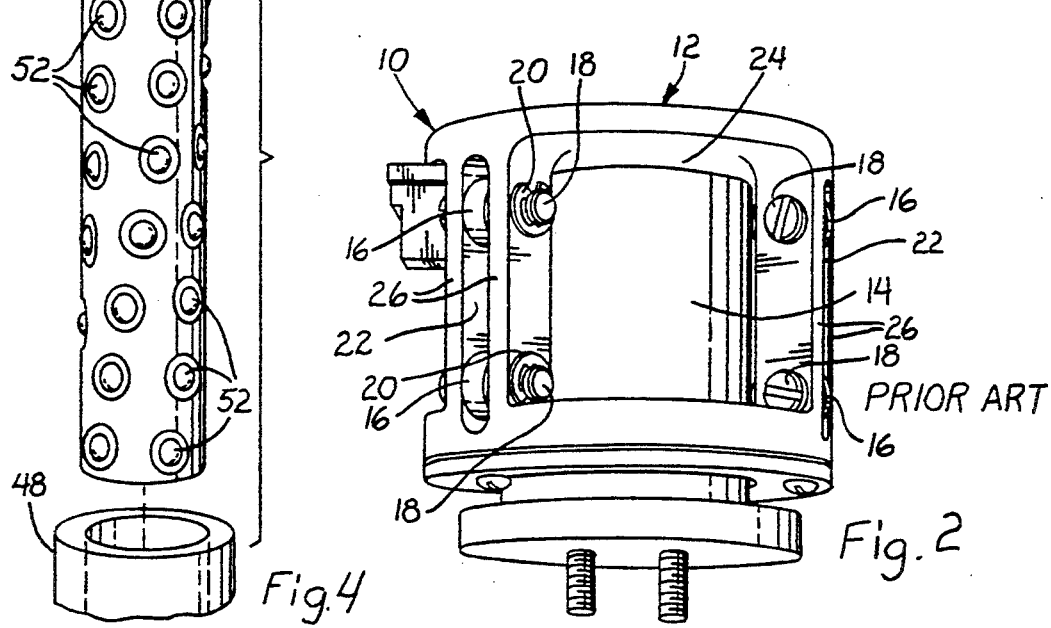
FIG. 2 illustrates a prior art robotic sub-assembly for movement along the Z-axis.
FIG. 4 is an exploded view of portions of the bearing sub-assembly, shaft, ball bushing, and outer race according to the present invention.

As illustrated in FIG. 4, preferably the ball bushing has a plurality of lines of bearings around the outer and inner cylindrical surface of the bushing. Preferably each line of bearings is skewed with respect to the longitudinal axis of the bushing. Such a construction provides a blanket bearing surface substantially between the cylindrical outer surface of the shaft and the inner surface of the race. In such a construction, each bearing engages and moves along a different portion of the the outer race and shaft. This reduces the wear on the outer race and shaft and improves durability and accurate placement of components by the robotic device. Preferably the wear surface of the outer race, the wear surface of the ball bearings, and the wear surface of the shaft are made from a material such as hardened chromium steel for improved durability. A suitable ball bushing assembly including an outer race, shaft and ball bushing is available from IKO International, Inc. under the trade name MINIATURE STROKE BALL BUSHING.

In a preferred embodiment, the ball bushing assembly shaft has a length of about 1.6 and a diameter of about 3 mm. The ball bushing has a longitudinal length of about 20 mm, an inner diameter of about 3.15 mm and an outer diameter of about 4.83 mm. The bearings have a diameter of about 1 mm. The race has a length of about 0.93 inches, an inner diameter of about 5 mm and an outer diameter of about 7 mm.

The sub-assembly may also include a flag 62 secured to the gripper plate 60 and a location sensor 64 secured to the cast housing. The location sensor detects the position of the flag, and thus the location of the component held by the grippers. The sensor communicates with a driver for selectively moving the gripper plate in a direction along the Z-axis.

The invention is particularly useful for the placement of surface mounted electronic components on circuit boards or ceramic substrates which requires great accuracy. Electrical leads of a component being placed on the circuit board may be damaged if the sub-assembly is subject to rotational error or error in movement in the Z-axis.

In operation, the robotic device moves the gripper in a X-Y axis direction and rotates the gripper to a position above an electronic component to be picked up. A means 66 pneumatically opens the gripper fingers. The gripper assembly is extended downwardly until the fingers are in the correct proximity to grasp the body of the component 68 or until the sensor communicates that the fingers have stopped moving toward the destination point because of an obstruction. The fingers are pneumatically closed to grasp the component. The gripper is then moved upward to lift the component out of the nest. The component is then moved in the X-Y axis direction to a position above holes in a circuit board for receiving leads of the component. The gripper is then extended downwardly to allow the leads of the component to go through the holes in the circuit board. When the component is properly positioned, the location flag on the gripper plate will indicate that the component is properly placed and the gripper finger would be pneumatically opened releasing the component. However, in the event that the component is misaligned with the holes in the circuit board, the free floating action of the bearing sub-assembly will allow travel in the Z-axis to prevent the further downward movement of the grippers. This free floating action prevents damage to the component leads or the circuit board. A search mechanism of the robotic device controlled by a programmable computer (not shown) may be activated so that the gripper is moved in an X-Y axis direction until the component leads drop through the circuit board holes. Again, the flag on the gripper plate will indicate that the component has been properly placed.

As can be appreciated from the foregoing, the present invention eliminates the time and expense associated with producing a cylindrical barrel sub-assembly of the prior art, improves durability of the robotic components, and greatly enhances the accuracy of the robotic device by producing zero error Z-axis compliance.

The embodiments of the invention in which an exclusive property or privilege is claimed are defined as follows:

1. A robotic device for picking and placing components from one place to another comprising:
   an arm movable in an X-Y-axis direction;
   a sub-assembly connected to the arm, the arm further including a driver for moving the sub-assembly in a Z-axis direction;
   a gripper secured to the sub-assembly for grasping and releasing components, the sub-assembly restricting movement of the gripper to free travel in the Z-axis direction relative to the sub-assembly;
   the sub-assembly comprising a housing having a plurality of closed cylindrical bores formed therein, a miniature stroke ball bushing assembly received in each of the bores for movement therein, each ball bushing assembly comprising a hollow cylindrical ball bushing having a plurality of bearings carried therein so as to form a movable rolling bearing surface, a cylindrical race received in each of said bores and constructed and arranged so that the bearings within the ball bushing assembly roll along portions of an inner cylindrical surface of the race as the sub-assembly is moved in the Z-axis direction, each ball bushing comprising a plurality of lines of bearing carried therein, each line being skewed with respect to the longitudinal axis of the bushing to provide a blanket bearing surface so that each bearing moves along a different portion of the cylindrical race, and a shaft having a portion of one end received in the ball bushing such that the ball bushing assembly is movable within the bore, and the other end of the shaft is connected to the gripper.

2. A process of mounting electrical components to a circuit board without damaging the board or the electrical leads of the components comprising:

moving component gripper fingers of a robotic device to a position above an electrical component having electrical leads extending downward from the component body to be picked up;

opening the fingers;

extending an arm connected to the gripper downward so that the fingers surround the component;

closing the fingers to grasp the component;

retracting the arm to lift the component up;

moving the gripper to a position above the circuit board having holes therein into which the electrical leads of the component are to be inserted;

extending the arm a distance sufficient to insert the leads through the holes in the circuit board upon proper alignment of the component to achieve such insertion of the leads;

preventing the extension of the arm from causing pressure to be exerted on the circuit board or leads sufficient to damage the same by providing a sub-assembly positioned between the arm and the gripper to restrict movement of the gripper with respect to the sub-assembly to free travel in a vertical direction, the sub-assembly having a housing having a plurality of closed cylindrical bores formed therein, a ball bushing assembly received in each of the bores for movement therein, the ball bushing assembly having a hollow cylindrical ball bushing having a plurality of bearings carried therein so as to form a movable rolling bearing surface along a portion of a cylindrical surface of the bushing assembly, and a shaft having a portion of one end received in the ball bushing such that the ball bushing is movable within the bore, and the other end of the shaft is connected to the gripper, wherein the one end of the shaft received by the ball bushing extends through the ball bushing and carries a retaining clip with a resilient O-ring interposed between the retaining clip and the bushing assembly, so that the ball bushing moves upward in the bore as the arm is extended and the component leads engage the circuit board to prevent damage to the board or leads.

3. A robotic device for picking and placing components from one place to another comprising:

an arm movable in an X-Y-axis direction;

a sub-assembly connected to the arm, the arm further including a driver for moving the sub-assembly in a Z-axis direction;

a gripper secured to the sub-assembly for grasping and releasing components, the sub-assembly restricting movement of the gripper to free travel in the Z-axis direction relative to the sub-assembly;

the sub-assembly comprising a housing having a plurality of closed cylindrical bores formed therein, a miniature stroke ball bushing assembly received in each of the bores for movement therein, the ball bushing assembly comprising a hollow cylindrical ball bushing having a plurality of bearings carried therein so as to form a movable rolling bearing surface, and a shaft having a portion of one end received in the ball bushing Such that the ball bushing is movable within the bore, and the other end of the shaft is connected to the gripper, wherein the one end of the shaft received by the ball bushing extends through the ball bushing and carries a retaining clip with a resilient O-ring interposed between the retaining clip and the bearing bushing assembly.

* * * * *